Sept. 2, 1952          S. FAULKNER          2,609,346
PREPARATION OF A NICKEL CATALYST DISPERSED IN FAT
Filed Sept. 1, 1948
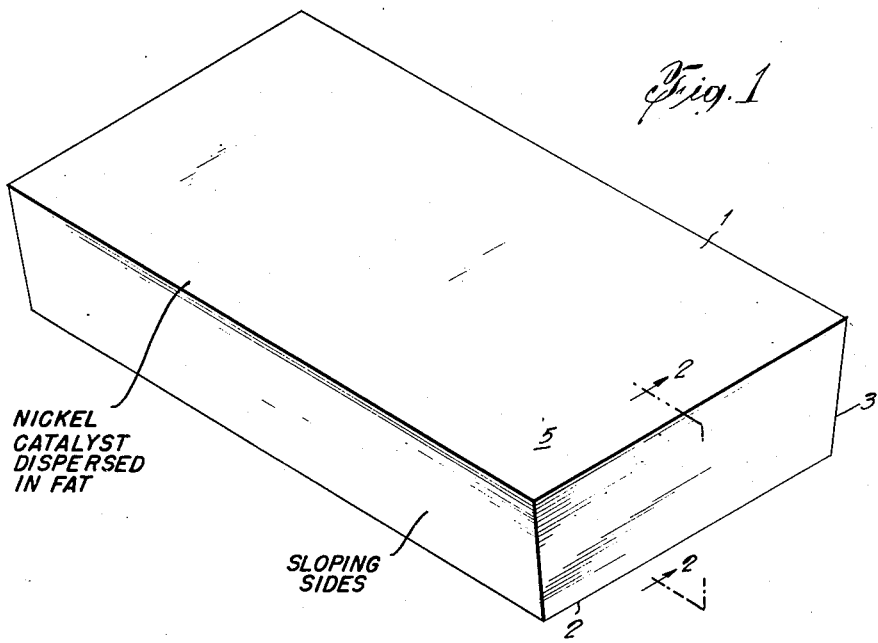
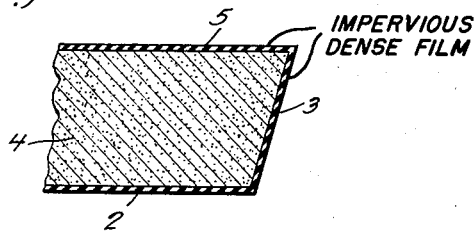
INVENTOR.
SEYMOUR FAULKNER
BY
ATTORNEY Patented Sept. 2, 1952

2,609,346

UNITED STATES PATENT OFFICE 2,609,346

PREPARATION OF A NICKEL CATALYST DISPERSED IN FAT

Seymour Faulkner, Summit, N. J., assignor to Catalytic Chemicals Division of E. F. Drew & Co., Inc., New York, N. Y., a corporation of Delaware Application September 1, 1948, Serial No. 47,170

7 Claims. (Cl. 252—430)

1

The present invention is directed to a catalyst body, more particularly to catalysts adapted for use in the hydrogenation of vegetable and animal oils which are the glycerides of mixed higher fatty acids.

Catalysts for this purpose are generally composed of finely divided nickel which has been reduced from its compounds and often containing other reduced metals in smaller amounts acting as promotors. The catalytic metal or metals are dispersed in a glyceride fat and in use a sufficient amount thereof is introduced into a reaction vessel containing a glyceride oil to be hydrogenated and held at a relatively high temperature so that the catalyst becomes dispersed in the oil in finely divided form. Hydrogenation takes place throughout the body of oil and after the operation is completed the oil is filtered to remove the catalyst.

At one time the catalyst was packaged in relatively large drums by pouring the molten fat containing the suspended metal catalyst into the same and allowing the material to cool and solidify. Because of the large bulk of the material in the drum and the low melting point, 75° to 80° F., of the fat, the cooling and solidification was quite slow. The mass remained liquid for a considerable time and at summer temperatures often did not solidify at all. Since there is a substantial difference between the specific gravities of the liquid and of the metal catalyst, the latter tended to settle out and after solidification, the mass was not uniform. Therefore, it was difficult to correctly estimate the amount of catalyst which was to be introduced into a predetermined quantity of oil to be hydrogenated. In using the catalyst it was necessary to remove from the drum the quantity of catalyst desired and this was a slow and difficult operation, requiring considerable labor; the difficulty was accentuated by the highly viscous character of the material in warm weather and by the semi-solid character thereof in cold weather. Because it is necessary to accurately weigh the catalyst prior to introduction into the hydrogenated vessel, the physical state of the catalyst in the drum rendered it quite difficult to correctly gauge the amount used. There were other difficulties involved and because of this the trade had discarded the use of drums for the catalyst.

Thereafter the catalyst was made up in a different manner and was produced and sold in the form of thin flakes. The flaking was accomplished by providing a mixture of melted fat and finely divided nickel, the fat having a relatively low melting point, usually not over about 100° F.

2 and the mixture was run over chilled rolls to form a thin film thereon, which was scraped off and thereby converted into flakes. Such flakes were quite thin, being from .014 to .020 inch in thickness as a general rule, and generally less than 0.25" in maximum dimension, and although it was convenient to use such flakes in that they could be weighed easily and introduced into the reaction vessel, there were certain inherent disadvantages therein. Because of the rapid chilling of the molten material, the flakes were somewhat porous and they allowed air to penetrate into the flakes. This effect was accentuated by the thinness thereof. If the temperature of the molten mass, which was generally between 275° to 350° F., was lowered, then it was impossible to form the desired flakes since the material on the chilled roll would pile up into gobs, which interfered with the operation.

A most serious disadvantage in the flake form of catalyst lay in the fact that because of the ease with which air penetrated into the very center of the film, deterioration of the catalyst took place. A nickel catalyst may be used in a hydrogenation operation at various temperatures, such as 400° F. in hydrogenating fish oils, and 300° to 350° F. for vegetable oils. In some operations, where highly selective hydrogenation is conducted, it is desirable to use still lower temperatures, such as 150° to 280° F., and to carry out the hydrogenation at such low temperatures until the very active portion of the catalyst is spent. This active portion is extremely sensitive to deterioration and in the flake form of catalyst, this portion was first attacked by the oxygen of the air and rendered relatively useless. The catalyst when in the flake form and stored at summer temperatures, lost a substantial amount of its activity in a very few weeks. Since catalyst is sold on the basis of active metal contained therein, this resulted in a serious economic loss.

The present invention is intended and adapted to overcome the difficulties and disadvantages inherent in the prior art, it being among the objects of the present invention to provide a method of producing a catalyst body, particularly for use in hydrogenation, which is simple and effective and results in a superior catalyst for the purpose.

It is also among the objects of the present invention to provide a catalyst body for hydrogenation of oils which is quite stable and which may be stored under adverse conditions for a relatively long time without any material amount of deterioration.

It is further among the objects of the present invention to provide a catalyst body which is in such form that it may be readily handled, quickly and effectively introduced into a hydrogenation operation without the necessity of accurate weighings, and which is advantageous for production, packaging and shipment.

In practicing the present invention, there is provided a catalyst which is of finely divided reduced nickel, usually containing a promotor, and dispersed in a glyceride fat. The fat has a relatively high melting point, above 105° F. and up to about 150° F., so that there will be no substantial softening of the catalyst body during shipment and storage. Usually the fat has a melting point of about 115° F. for winter shipment and about 140° F. for summer shipment. The mixture of catalyst and fat is melted and the temperature of the molten mass is made relatively low, being usually under 200° F. and preferably between 160° and 175° F., or about 40° to 60° F. above the melting point of the fat.

There is provided a series of metal forms into which the mixture is cast. The forms are of substantial size so as to provide a cake or body of catalyst of substantial thickness. The minimum thickness is .25 inch and may run up to 4 inches or more. In the preferred form the body has a thickness of about 1 to 3 inches. The other dimensions are usually considerably greater and considerable variation in such size is quite feasible.

The molds or forms are kept cool and the liquid mass is poured into the same. Almost immediately there is a chilling and solidification of the hard fat used along the sides and bottom of the form, whereby an impervious film is formed which usually is mostly fat with very little catalyst therein. The cooling and solidification of the entire mass is quite rapid and usually requires no more than a few minutes where the starting temperature of the forms is between 50° and 60° F. During the period of solidification of the mass a very small portion of the fat tends to rise to the top surface of the mass and forms an impervious film on the top. This completes the protection afforded by the fatty film against the entrance of air. Even if some air should succeed in penetrating, it could only penetrate a very short distance and thus in any case the deterioration which might take place would be but a negligible fraction of the catalyst present.

While various catalyst compositions may be used, it is preferred to utilize a composition as follows:

| | Per cent |
|---|---|
| Hardened oil | 48 to 70 |
| Active metal | 20 to 32 |
| Filter aid | 10 to 20 |

The oil or fat may be of vegetable or animal origin, such as fish oil, cottonseed oil, or soya bean oil, or such compounds as stearine or mixtures containing the same may be used. The active metal is primarily reduced finely divided nickel with or without a promotor such as copper, cobalt, chromium, molybdenum, palladium, silver or the platinum metals. The filter aid may be diatomaceous earth, fuller's earth, activated carbon or the like. The filter aid has a large bulk for its weight and the particles of catalyst are supported in the oil by the filter aid, so that the particles do not settle prior to the cooling and solidification of the whole mass.

In the accompanying drawing constituting a part hereof and in which like reference characters indicate like parts.

Fig. 1 is a perspective view of a catalyst body made in accordance with the present invention, and Fig. 2 is a fragmentary vertical cross-sectional view thereof taken along the line 2—2 of Fig. 1.

The form of the catalyst body or cake 1 is roughly rectangular with the sides and ends sloping inwardly to give a rhomboid appearance in end and side views. The molds are, of course, of corresponding shape and are of metal having a highly polished surface, such as of tin. The slope of the sides and ends is primarily intended as a means for easily removing body 1 from the mold.

A specific composition suitable for use contains the following constitutents:

| | Per cent |
|---|---|
| Hardened oil (melting point 132° to 135° F.) | 60 |
| Active metal | 25 |
| Filter aid | 15 |

The temperature of the mass is held at 170° F. and it is poured into the mold to a suitable depth. As the mass flows over the bottom of the mold, a film 2 of fat is formed, said film having a thickness of from .02 to .10 inch when the surrounding temperature is about 60° F. As the molten mass builds up in the mold, a film 3 of similar nature is formed along the sides and ends of the cake or block of material. The interior 4 of the mass remains molten for a short time, allowing slight separation of some of the fat to form an upper surface 5 of a fatty film. Within a few minutes the body 4 has become solid because of the relatively low temperature of the initial mass and the high melting point of the fat. Films 2, 3 and 5 are relatively dense and smooth and impervious to air to a large extent. This acts as a highly protective coating and avoids loss of catalyst activity by oxidation. Thereby even the most sensitive portion of the catalyst is preserved.

Mass 4 is porous in appearance but access of air thereto is prevented by the films on the outside of the cake. In use, one or more cakes of the catalyst are introduced into hot oil to be hydrogenated and the outer films readily melt therein. This exposes body 4, which because of its porous nature allows the hot oil to readily penetrate and thus the entire mass is quickly disintegrated. It is thereby uniformly dispersed in very fine particles throughout the mass of oil.

Tests have shown that a catalyst body of this type may be stored for many months at temperatures in the neighborhood of 100° F. without any substantial deterioration in the activity of the catalyst. It is convenient to handle in the manufacture thereof, in that the cakes may be easily removed from the molds and placed in envelopes and a number of such cakes may be packed in a carton for shipment. A convenient size of catalyst body is one which is about 10 inches by 15 inches and 2 inches thick, having an approximate weight of 12.5 lbs. Such cakes may be packed six to a carton, so that each carton contains 75 lbs. In use, the operator may take one or more of such cakes and even break off a half or quarter of the cake to obtain the weight of catalyst he desires. No close weighing is necessary and the introduction of the cakes into the hot oil is a very simple matter. It is not necessary to seal the cakes against the air as the film of fat thereon is sufficient protection.

Although the invention has been described setting forth a specific embodiment thereof, the invention is not to be limited thereto as various changes in the details may be made within the spirit of the invention. For instance, the catalyst may be of different character than that specifically described, and the hardened oils or fats associated therewith may be replaced by equivalent materials such as synthetic fats, higher fatty acids or the like. The form of cake illustrated in the drawing is representative of various forms which may be used, such as cubical, spherical, ovate, combinations thereof, and various other shapes. It is necessary in all cases however, that the minimum thickness be quite substantial as set forth above.

I claim:

1. A method of making a catalyst body which comprises providing a mixture of finely divided reduced nickel, a glyceride fat and a filter aid in the following proportions:

|  | Per cent |
|---|---|
| Glyceride fat | 48–70 |
| Active nickel | 20–32 |
| Filter aid | 10–20 | said glyceride having a melting point of 105° F. to 150° F., said mixture being at a temperature below 200° F. and above said melting point, pouring said mixture into a mold at a temperature not over 60° F. to a depth of 1 to 3 inches, whereby a small portion of the contained molten fat will rise to the surface to form an impervious film, while said mixture is cooling to a solid without substantial segregation of said nickel.

2. A method of making a catalyst body which comprises providing a mixture of finely divided reduced nickel, a glyceride fat and a filter aid in the following proportions:

|  | Per cent |
|---|---|
| Glyceride fat | 48–70 |
| Active nickel | 20–32 |
| Filter aid | 10–20 | said glyceride having a melting point of 115° F. to 140° F., said mixture being at a temperature between 160° F. and 175° F., pouring said mixture into a mold at a temperature not over 60° F. to a depth of 1 to 3 inches, whereby a small portion of the contained molten fat will rise to the surface to form an impervious film, while said mixture is cooling to a solid without substantial segregation of said nickel.

3. A method of making a catalyst body which comprises providing a mixture of finely divided reduced nickel, a glyceride fat and a filter aid in the following proportions:

|  | Per cent |
|---|---|
| Glyceride fat | 48–70 |
| Active nickel | 20–32 |
| Filter aid | 10–20 | said glyceride having a melting point of 105° F. to 150° F., said mixture being at a temperature below 200° F. and above said melting point, pouring said mixture into a mold at a temperature between 50° F. and 60° F. to a depth of 1 to 3 inches, whereby a small portion of the contained molten fat will rise to the surface to form an impervious film, while said mixture is cooling to a solid without substantial segregation of said nickel.

4. A method of making a catalyst body which comprises providing a mixture of finely divided reduced nickel, a glyceride fat and a filter aid in the following proportions:

|  | Per cent |
|---|---|
| Glyceride fat | 48–70 |
| Active nickel | 20–32 |
| Filter aid | 10–20 | said glyceride having a melting point of 115° F. to 140° F., said mixture being at a temperature between 160° F. and 175° F., pouring said mixture into a mold at a temperature between 50° F. and 60° F. to a depth of 1 to 3 inches, whereby a small portion of the contained molten fat will rise to the surface to form an impervious film of a thickness of .02 to .10 inch, while said mixture is cooling to a solid without substantial segregation of said nickel.

5. A method of making a catalyst body which comprises providing a mixture of finely divided reduced nickel in a molten glyceride fat containing an inorganic finely divided filter medium, the amount thereof being less than the amount of nickel, pouring said mixture into a mold at a temperature not over 60° F., whereby the mixture is cooled to solidification in a few minutes, segregation of nickel is substantially prevented and an impervious film of fat is formed on the surfaces of the catalyst body.

6. A method of making a catalyst body which comprises providing a mixture of finely divided reduced nickel in a molten glyceride fat containing diatomaceous earth, the amount thereof being less than the amount of nickel, pouring said mixture into a mold at a temperature not over 60° F., whereby the mixture is cooled to solidification in a few minutes, segregation of nickel is substantially prevented and an impervious film of fat is formed on the surfaces of the catalyst body.

7. A method of making a catalyst body which comprises providing a mixture of finely divided reduced nickel in a molten glyceride fat having a melting point of 105° F. to 150° F., said fat being at a temperature below 200° F. and containing an inorganic finely divided filter medium, the amount thereof being less than the amount of nickel, pouring said mixture into a mold at a temperature not over 60° F., whereby the mixture is cooled to solidification in a few minutes, segregation of nickel is substantially prevented and an impervious film of fat is formed on the surfaces of the catalyst body.

SEYMOUR FAULKNER.

REFERENCES CITED

The following references are of record in the file of this patent:

UNITED STATES PATENTS

| Number | Name | Date |
|---|---|---|
| 1,078,541 | Ellis | Nov. 11, 1913 |
| 1,187,775 | Oswald et al. | June 20, 1916 |
| 1,390,683 | Ellis | Sept. 13, 1921 |
| 2,084,687 | Jespersen | June 22, 1937 |
| 2,424,811 | Freed | July 29, 1947 |

OTHER REFERENCES

Wurster: Hydrogenation of Fats, Ind. & Eng. Chem., vol. 32, No. 9, pg. 1195–Sept. 1940.